(12) United States Patent
Adolfsson

(10) Patent No.: US 7,573,892 B2
(45) Date of Patent: Aug. 11, 2009

(54) CENTRALLY SITUATED VOIP

(75) Inventor: Lars Adolfsson, Tyreso (SE)

(73) Assignee: B2 Bredband AB, Stockholm (SE)

( * ) Notice: Subject to any disclaimer, the term of this patent is extended or adjusted under 35 U.S.C. 154(b) by 545 days.

(21) Appl. No.: 11/177,478

(22) Filed: Jul. 11, 2005

(65) Prior Publication Data
US 2007/0025378 A1  Feb. 1, 2007

(30) Foreign Application Priority Data
Jul. 7, 2005  (SE) .................................... 0501592

(51) Int. Cl.
*H04L 12/28* (2006.01)

(52) U.S. Cl. ...................................... 370/401; 370/352

(58) Field of Classification Search ........................ None
See application file for complete search history.

(56) References Cited

U.S. PATENT DOCUMENTS 6,404,764 B1 * 6/2002 Jones et al. ................. 370/352
2006/0077968 A1 * 4/2006 Pitsoulakis et al. .......... 370/352

* cited by examiner

*Primary Examiner*—Duc C Ho
(74) *Attorney, Agent, or Firm*—Nixon & Vanderhye P.C.

(57) ABSTRACT

The invention relates to a switch or router (10) connected to and centrally situated adjacent to a voice over Internet protocol box (22) in a premise connected in a broadband network standard. It comprises an interface (14) to a category infrastructure for distribution of data to flats and offices in premises. The category infrastructure (12, 16) comprises four twisted wire pairs to every flat and office, whereby two pairs are utilized by the broadband standard. Voice over Internet is connected through a first cable interface (50) with multiple connections, and a second cable interface (60) connected and wired together in a registered jack (18, 52) with a category infrastructure. Two of the wire pairs (62) provide two voice over Internet protocol subscription possibilities to every flat and office and two of the broadband connections (64).

3 Claims, 3 Drawing Sheets

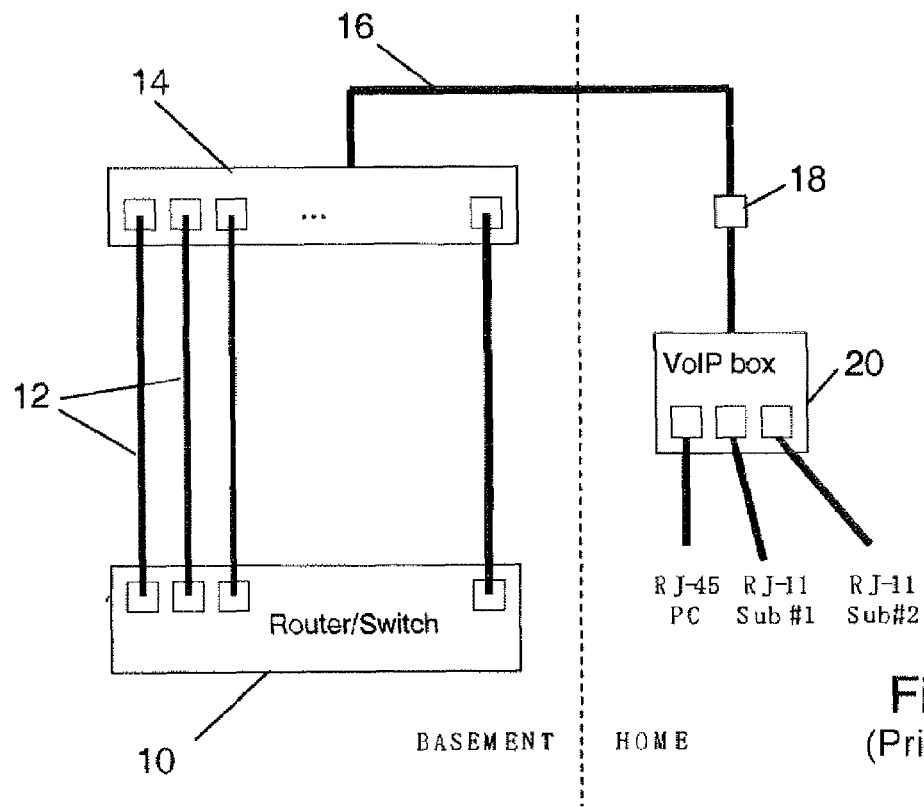
Fig. 1
(Prior Art)
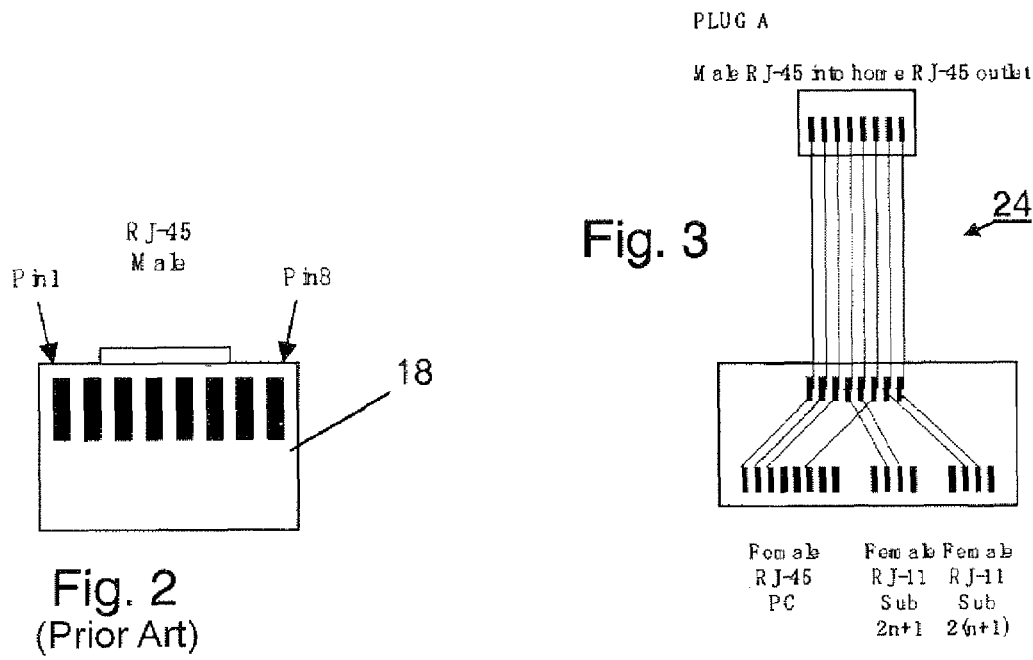
Fig. 2
(Prior Art)
Fig. 3

CENTRALLY SITUATED VOIP

TECHNICAL FIELD

The present invention pertains to a reuse of a network infrastructure dedicated for Internet Service such that additional Telephony Services may be provided over the same infrastructure. Herewith, it regards a switch or router in a broadband network standard, having an interface to a category infrastructure for distribution of data to households/flats/offices in premises. The category infrastructure delivers four twisted wire pairs to every household, whereby two pairs are utilized by the broadband standard.

BACKGROUND

Currently, a customer that is provided Voice over IP (VoIP) is given a VoIP Box (CPE, Customer Premises Equipment). The CPE has to be placed in customer's homes, which has several negative implications by customer support calls being increased due to the problem of the customer handling the CPE in a wrong manner, e.g., erroneous cabling etc. Such a solution is also expensive since each customer needs dedicated resources in terms of electronic equipment such as for instance CPU and DSP units.

SUMMARY OF THE INVENTION

The present invention aims to solve problems relating to a customer being provided Voice over IP (VoIP). Such problems relate to avoiding for instance erroneous cabling, and that it is expensive since each customer needs dedicated resources in terms of electronic equipment. Hence, the present invention sets forth a switch or router connected to and centrally situated adjacent to a voice over Internet protocol box in a premise connected in a broadband network standard. The invention comprises:

an interface to a category infrastructure for distribution of data to flats and offices in premises, the category infrastructure comprising four twisted wire pairs to every flat and office, whereby two pairs are utilized by the broadband standard;

the voice over Internet protocol box circuitry being connected to the switch or router through a broadband connection and connected to a connector having multiple outlets for voice over Internet through a first cable interface with multiple connections connecting to the connector;

a second cable interface connected to the connector and wired together in a registered jack with a category infrastructure emanating from the switch or router and connected to a category interface interfacing the switch, router and VoIP box; and leading four pairs of category wires from the category interface to every premise, thus conveying two voice over Internet connections in the premise to an outlet, serving every flat and office from the voice over Internet box centrally situated position utilizing two of the wire pairs to provide two voice over Internet protocol subscription possibilities to every flat and office and two of the broadband connections.

In one embodiment the present invention interfaces an RJ-45 outlet and a plug, at least one mounted in every household, the plug having an RJ-45 connector fitting the outlet, and a cabling connecting a unit with three female connectors to mimic a PC RJ-45 outlet and two VoIP RJ-11 outlets. Another embodiment comprises that the plug is manufactured such that is connects firm to the RJ-45 outlet.

Yet another embodiment comprises that the voice over Internet control box circuitry has one circuitry connected to every port to a patch panel.

A still further embodiment comprises that the voice over Internet control box circuitry is limited to a specific number below the number of ports connected to a patch panel by estimation of the total number of flats and offices, which simultaneously are making calls.

Furthermore, the present invention sets forth a method adapted to a switch or router connected to and centrally situated adjacent to a voice over Internet protocol box in a premise connected to a broadband network standard. The method comprises the features:

interfacing a category infrastructure for distribution of data to flats and offices in premises, the category infrastructure comprising four twisted wire pairs to every flat and office, whereby two pairs are utilized by the broadband standard;

connecting the voice over Internet protocol box circuitry to the switch or router through a broadband connection and connected to a connector having multiple outlets for voice over Internet through a first cable interface with multiple connections connecting to the connector;

connecting a second cable interface to the connector wired together in a registered jack with a category infrastructure emanating from the switch or router and connected to a category interface interfacing the switch, router and VoIP box; and leading four pairs of category wires from the category interface to every premise, thus conveying two voice over Internet connections in the premise to an outlet, serving every flat and office from the voice over Internet box centrally situated position utilizing two of the wire pairs to provide two voice over Internet protocol subscription possibilities to every flat and office and two of the broadband connections.

The present inventions dependent system claims are also pending for the method claims in accordance with the attached set of claims.

BRIEF DESCRIPTION OF THE DRAWINGS

Henceforth reference is had to the accompanying set of drawings for a better understanding of the present invention with its embodiments and given examples, wherein:

FIG. 1 schematically illustrates a prior art switch/router with an attached VoIP box;

FIG. 2 schematically illustrates a prior art RJ-45 outlet utilized to connect Ethernet and telephony traffic;

FIG. 3 schematically illustrates a plug in accordance with the present invention which wiring mimics a prior art VoIP outlet;

DETAILED DESCRIPTION OF PREFERRED EMBODIMENTS

Currently, a customer that is provided VoIP (Voice over the Internet Protocol) relies on the solution depicted in FIG. 1. FIG. 1 schematically illustrates a prior art switch/router 10 with an attached VoIP box 20. The router 10 is frequently situated in a basement of premises and connected by a CAT 3 or 5 (CAT; Category) wiring 12 to a patch panel 14. A patch panel 14 is utilized to distribute the CAT infrastructure to each and every household in premises. It is appreciated that a household should be interpreted as a flat where people are living or an office where they are working and any other suitable space for broadband technology in a premise.

A CAT 3 infrastructure manages transmission speeds of 30 Mbps and a CAT 5 should manage speeds up to 100 Mbps.

Figure 4:
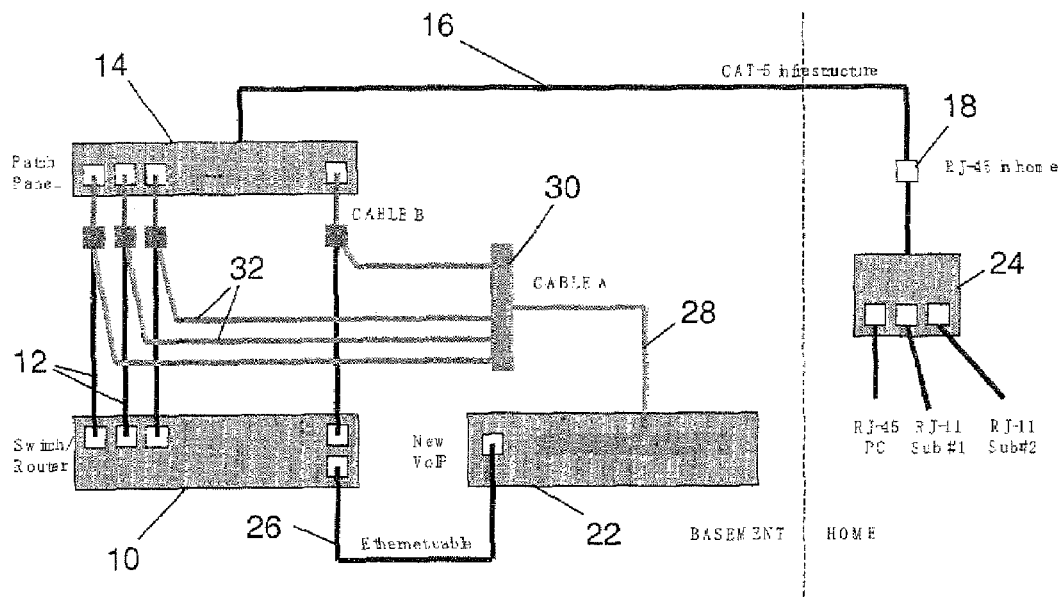
FIG. 4 schematically illustrates a switch/router comprising cabling and VoIP constituting a central VoIP circuitry in accordance with the present invention.

The left side of FIG. 1 illustrates the basement, where equipment is typically located in the premises, thus where the active Internet equipment switch or router is situated. The Internet equipment is connected to a backbone network (not shown) and to a patch panel 14. The patch panel is connected to every registered jack outlet (RJ-45) in the different households, one shown to the right in the FIG. 1, and the infrastructure is in one embodiment typically provided by a CAT-5 network wiring 16 to the households. The dashed line in FIG. 1, also in FIG. 4, schematically indicates a border between a household/flat/office and a basement in a premise.

In a home, the VoIP Box or CPE 20 (CPE; Customer Premises Equipment) is commonly connected directly to a RJ-45 outlet 18. This configuration provides a good quality to VoIP traffic. The VoIP Box 20 thus is at least equipped with one RJ-45 outlet where a PC or hub/switch could be connected. In addition to this, the VoIP Box also typically contains two RJ-11 outlets to support two telephony subscriptions, denoted Sub#1 and Sub#2 in FIG. 1. It is appreciated that FIG. 1 depicts technology regarded as prior art.

FIG. 2 schematically illustrates a prior art RJ-45 outlet, as mentioned above, utilized to connect Ethernet and telephony traffic. The Pin-out in this embodiment is such that the Internet service utilizes pins 1 and 2 (one pair) and pins 3 and 6 (second pair). The two remaining pairs (4 and 5, 7 and 8) are then utilized to deliver VoIP in accordance with prior art.

The present invention is basically based on the notion that a CAT-5 or CAT-3 network utilizes four twisted pairs and the Ethernet broadband (or other like broadband) standard utilizes two of those pairs. This means that the two additional pairs could be utilized to provide two VoIP subscriptions. The Ethernet cabling 12, 16 is shown in FIG. 4. Although Ethernet is utilized to describe a broadband network, it is appreciated that like networks utilizing a category cabling similar to the herein described are candidates to the present invention.

To be able to feed the two VoIP subscriptions to the actual homes/flats it is necessary to insert a special plug in accordance with the present invention, denoted plug A in FIG. 3 with reference numeral 24, which wiring is depicted in FIG. 3. It is to be noted that the RJ-45 male connector is to be inserted into the RJ-45 outlet in the flat/home, and the other end consists of a unit with three female connectors to mimic the PC RJ-45 outlet and the two VoIP RJ-11 outlets. The plug can be manufactured such that is connects firm to the RJ-45 outlet.

Figure 7:
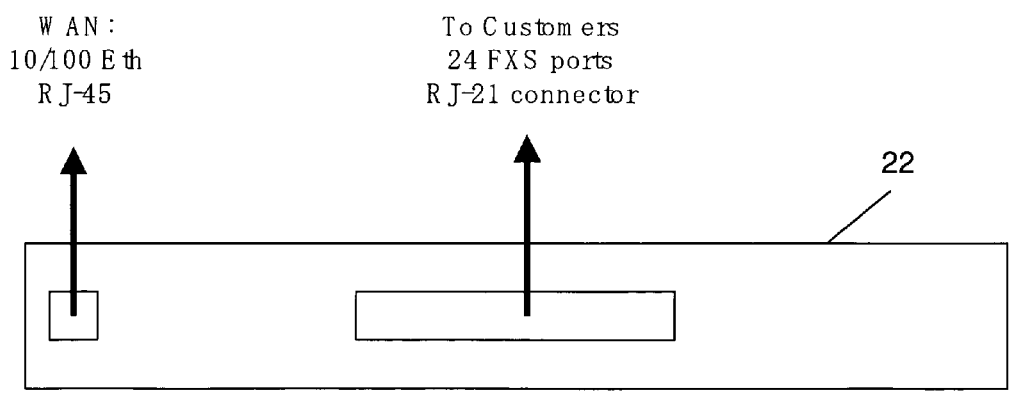
FIG. 7 schematically illustrates a VoIP box topology in accordance with the present invention.

FIG. 4 schematically illustrates a switch/router 10 and a VoIP box 22 with multiple VoIP circuits, thus constituting a centrally situated VoIP circuitry in accordance with the present invention. Solutions in accordance with the present invention rely on maintaining the switch/router as depicted in FIG. 1, and utilize a stand-alone box 22 for VoIP services. Vendors providing this type of stand-alone box 22 equipment are, e.g. Cisco IAD2430 (www.cisco.com) and the Audiocodes MP-124 (www.audiocodes.com)). The topology is depicted in FIG. 7 below.

In addition to the VoIP box 22, to the right in the basement, there are two new cable interfaces 28, 32 connected through a connector 30 that need to be provided in accordance with the present invention. Alternatively, it is also possible to manufacture a new cable connecting patch panel 14, switch/router 10 and VoIP box 22.

Figure 5:
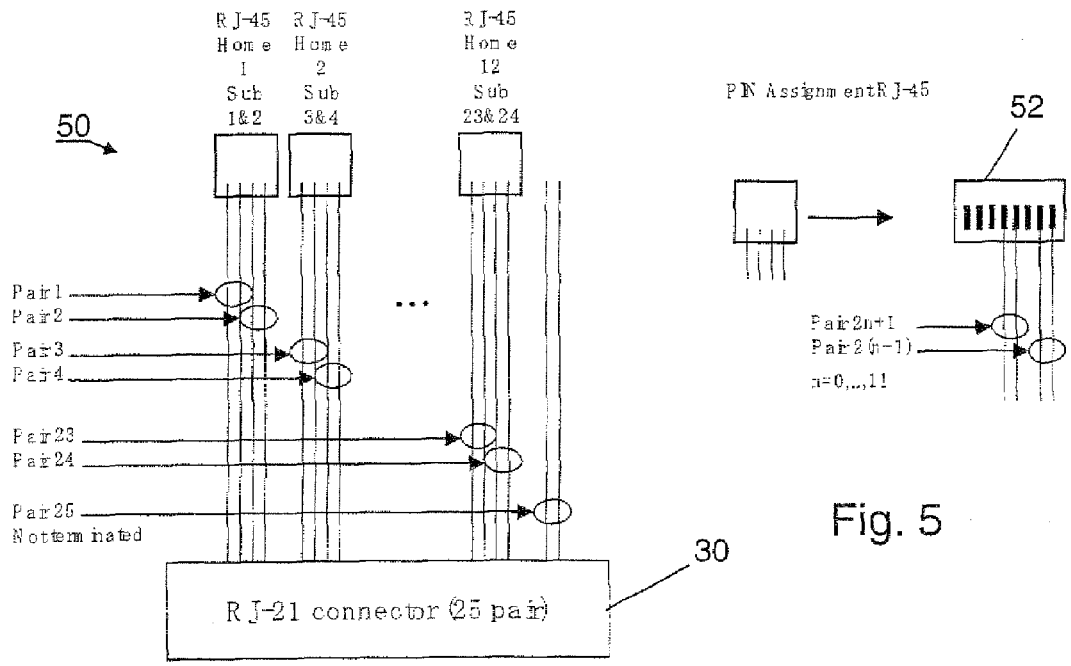
FIG. 5 schematically illustrates a first cable in accordance with FIG. 4 of the present invention.

A first cable interface 50, Cable A, in accordance with the present invention consists of the wiring depicted in FIG. 5 connected to for instance a connector RJ-21, 30, for 25 pairs of wires transmitting VoIP traffic. Only 24 pairs are used or terminated in the present embodiment as two VoIP connections are dedicated every flat or office, which is not possible with an odd number as 25 pairs constitute. The pin assignment to the RJ-45, denoted 52 in FIG. 5, for VoIP is depicted for a comparison with a second cable interface in FIG. 6

Figure 6:
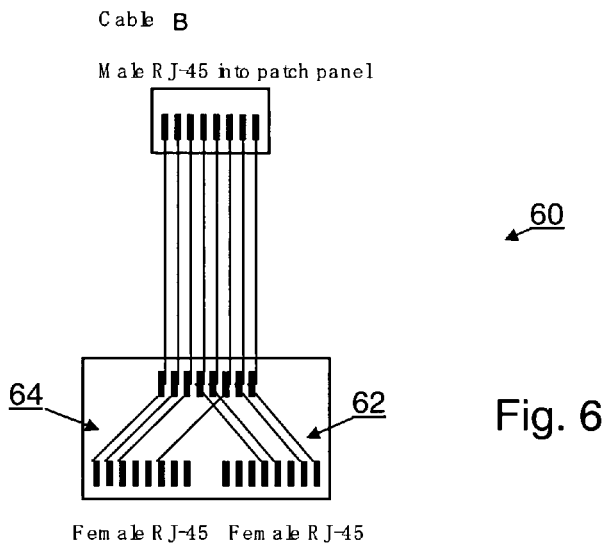
FIG. 6 schematically illustrates a an RJ-21 connector and a second cable in accordance with FIG. 4 of the present invention.

A second cable interface 60 in accordance with the present invention, Cable B, is illustrated in FIG. 6, with its wiring and RJ-45 male and female connectors. Female jack 62 has an identical pin assignment to jack 52 in FIG. 5, and thus leads the VoIP signals from first cable interface 50 to the patch panel 14 and further through a category cable 16 to a flat. Moreover, the second cable interface A is connected to the CAT cable 12, leading the broadband traffic to the patch panel 14, through a female jack 64 as depicted in FIG. 6.

The traffic patterns of telephony as such teach that it is highly unlikely that all lines 28, 32 in interface 50, 60 are used at the same time. Typically, as a non limiting example, only one tenth of the lines are used at the same time. This is of course based on large number statistics, but with the use of up to 24 subscribers the assumption makes sense. This implies that resources such as CPU and DSP may be used in a much more efficient manner.

FIG. 7 schematically illustrates the topology of a VoIP box in accordance with the present invention.

The WAN (Wide Area Network) is connected to a port in the switch/router and through an Ethernet cable 26 the RJ-21 connector 30 is connected using Cable A, 50.

Making use of the notion mentioned allows the VoIP equipment 22 to be situated at a central place in a premise for instance in the basement. This has at least two advantages. Firstly, it is possible to locate all VoIP 22 resources to a central place as for instance the basement in a premise, and thus minimizing the amount of electronic equipment, and secondly, the customer is unable to tamper with the VoIP 22 equipment which unfortunately often leads to support calls deriving operational costs.

There are mainly two solutions to the present invention. Another solution is based on the notion that the VoIP equipment is collocated in the same hardware as the switch/router, which is described in a co-pending patent application.

The attached set of claims describes other embodiments of the present invention apparent to a person skilled in the art.

The invention claimed is:

1. A switch or router having voice over Internet protocol box circuitry comprising:
  a switch or router connected to and centrally situated adjacent to a voice over Internet protocol box in a premise connected in a broadband network standard, comprising:
    an interface to a category infrastructure for distribution of data to flats and/or offices in a premise, said category infrastructure comprising four twisted wire pairs to each flat and/or office;
    the voice over Internet protocol box being connected to said switch or router through a broadband connection and connected to a connector for providing voice over Internet through a first cable interface with multiple connections connecting to said connector;
    a second cable interface connected to said connector and wired together in a registered jack with the category infrastructure emanating from said switch or router; and
    said four twisted wire pairs leading from said interface to the category infrastructure, thus conveying two voice over Internet connections to an outlet in said premise, serving each flat and/or office from said voice over Internet box centrally situated position utilizing two of said four twisted wire pairs to provide two voice over Internet protocol subscription possibilities to each flat and/or office and the other two twisted wire pairs for broadband connection.

2. The switch or router according to claim 1, wherein said voice over Internet control box has circuitry connected to each output port of a patch panel.

3. The switch or router according to claim 1, wherein said voice over Internet control box circuitry is limited to a specific number of telephony connections which is less than the number of output ports connected to a patch panel by estimation of the total number of flat and/or offices, which simultaneously are making calls.

* * * * *